Figure 1:
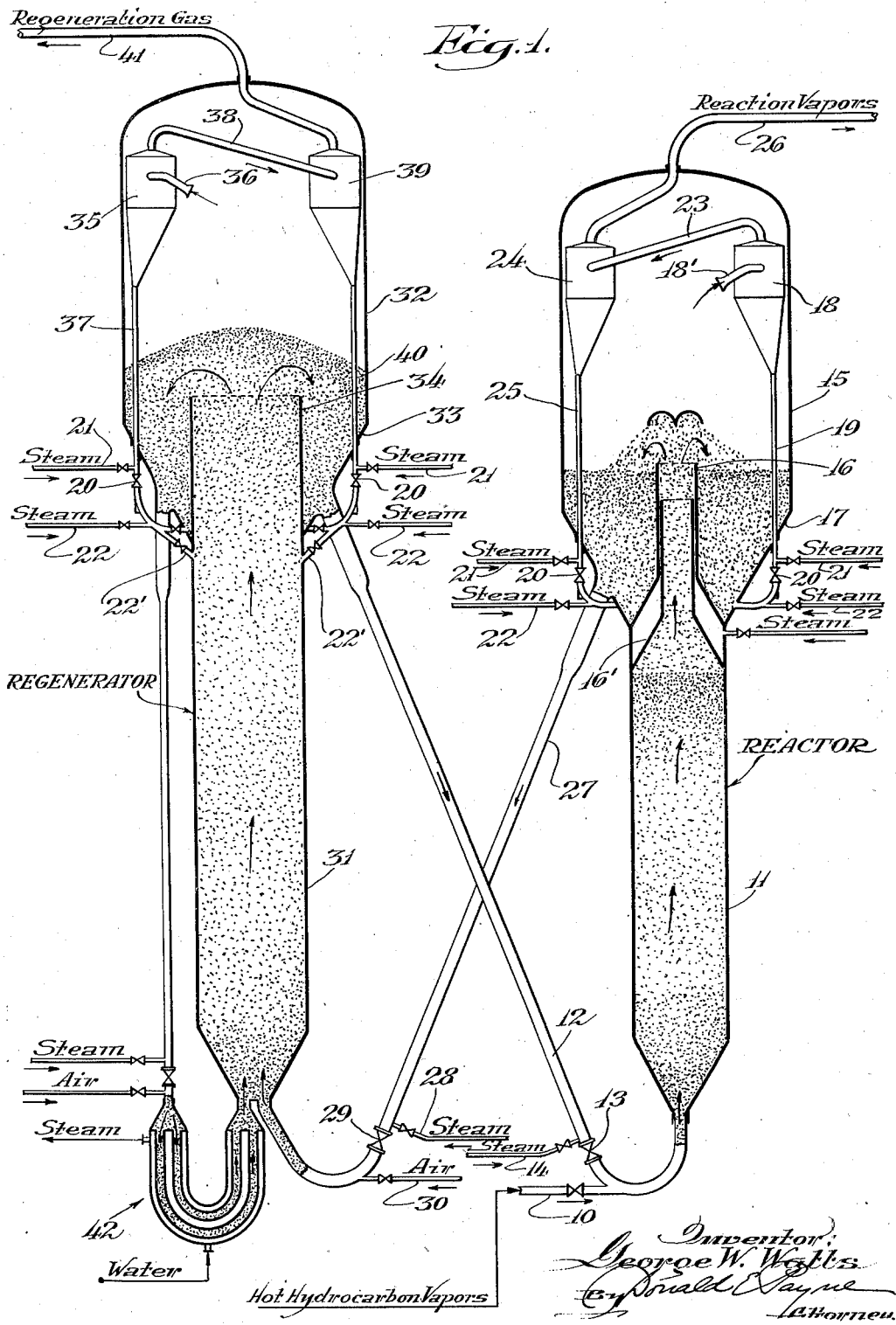

June 5, 1945.  G. W. WATTS  2,377,657

CATALYTIC HYDROCARBON CONVERSION SYSTEM

Filed Aug. 30, 1941  2 Sheets—Sheet 1

Patented June 5, 1945

2,377,657

UNITED STATES PATENT OFFICE 2,377,657

CATALYTIC HYDROCARBON CONVERSION SYSTEM

George W. Watts, Flossmoor, Ill., assignor to Standard Oil Company, Chicago, Ill., a corporation of Indiana Application August 30, 1941, Serial No. 409,040

15 Claims. (Cl. 196—52)

This invention relates to a catalytic conversion system and it pertains more particularly to improvements in methods and means for handling powdered catalyst in a so-called fluid-type hydrocarbon conversion system.

In the fluid-type catalytic conversion system a powdered catalyst effects conversion while it is suspended in reaction gases or vapors. The catalyst may then be separated from reaction products and suspended in a gas mixture for regeneration, in which case the regenerated catalyst must be separated from regeneration gases before it is returned for resuspension in reaction gases or vapors. In such systems the powdered catalyst may be pneumatically conveyed to high levels and it may flow through standpipes, dip legs or other conduits from high levels to low levels. If there is any interruption in this downward flow of separated solids in a conduit there is a tendency of the solids to bridge and thereby cause a plugging of the conduit. An object of my invention is to provide method and means for preventing such catalyst bridging or plugging.

A further object of my invention is to provide improved methods and means for separating finely divided catalyst particles from gases or vapors leaving a reaction or regeneration zone and for returning the separated catalyst to the system. When multi-stage cyclones are employed for effecting catalyst separation there must necessarily be a pressure drop across each stage; an object of my invention is to provide improved methods and means for insuring the desired operating pressures in these various stages and to secure effective operation of each separate and individual cyclone separator in the system. A further object is to provide improved methods and means for obtaining access to valves and connections for controlling the operation of cyclone separators. A further object is to provide improved methods and means for recombining centrifugally separated fine catalyst particles with coarse catalyst particles which have been separated by settling or other means.

A further object of the invention is to provide improved methods and means for preventing a resuspension of cyclone separated catalyst fines into the gases or vapors entering the cyclone separation system. A further object is to provide a system wherein the steam employed for returning cyclone separated fines to the system may also function to effect an admixture of catalyst fines with coarser catalyst particles and a stripping of gases or vapors from both fine and coarse catalyst particles. Other objects of the invention will be apparent as the detailed description proceeds.

In practicing my invention I superimpose a large settling zone above a conversion reactor or regeneration reactor, or both, the large settling zone being connected to the reactor by an inclined outwardly extending wall. A plurality of cyclone separators are mounted in the enlarged settling chamber and around its periphery so that dip legs may extend substantially vertically from each cyclone through the outwardly extending wall. Steam for aerating catalyst in the dip leg may be introduced into the dip leg at an accessible point outside of the reactor and settling chamber and likewise an exposed control valve at the lower end of the dip leg is readily accessible. Catalyst from the base of each cyclone dip leg may be injected into a dense phase of coarse catalyst material by means of steam and when the dense phase is settled catalyst, this steam may serve as the stripping and aerating gas for freeing catalyst from gases and vapors. By injecting the cyclone separated catalyst below the level of settled or dense phase catalyst in the separation chamber or into another reaction zone I prevent undue recirculation of these fines through the cyclones.

In accordance with my present invention, separate positive means are employed at the base of each cyclone dip leg for discharging catalyst therefrom either into a settled mass of catalyst in the separation chamber or into a separate catalyst collecting chamber or receiver. By using a mechanical or fluid pump at the base of each dip leg I avoid many of the difficulties that arise when gravity flow is relied upon in a system of changing pressure conditions.

When a separate collector or receiver is employed for cyclone separated catalyst fines I maintain a substantially constant pressure in said receiver which may be substantially equal to the pressure in the settling chamber or conduit leaving the settling chamber or which may be maintained at a slightly higher pressure than the pressure in the settling chamber. The maintenance of a constant pressure in this catalyst fines receiver is of considerable importance both from the standpoint of regulating catalyst discharge from dip legs thereto and from the standpoint of regulating catalyst transfer therefrom. Catalyst may be transferred from this receiver either to a body of coarser catalyst in the separation chamber or directly to another reactor.

Figure 2:
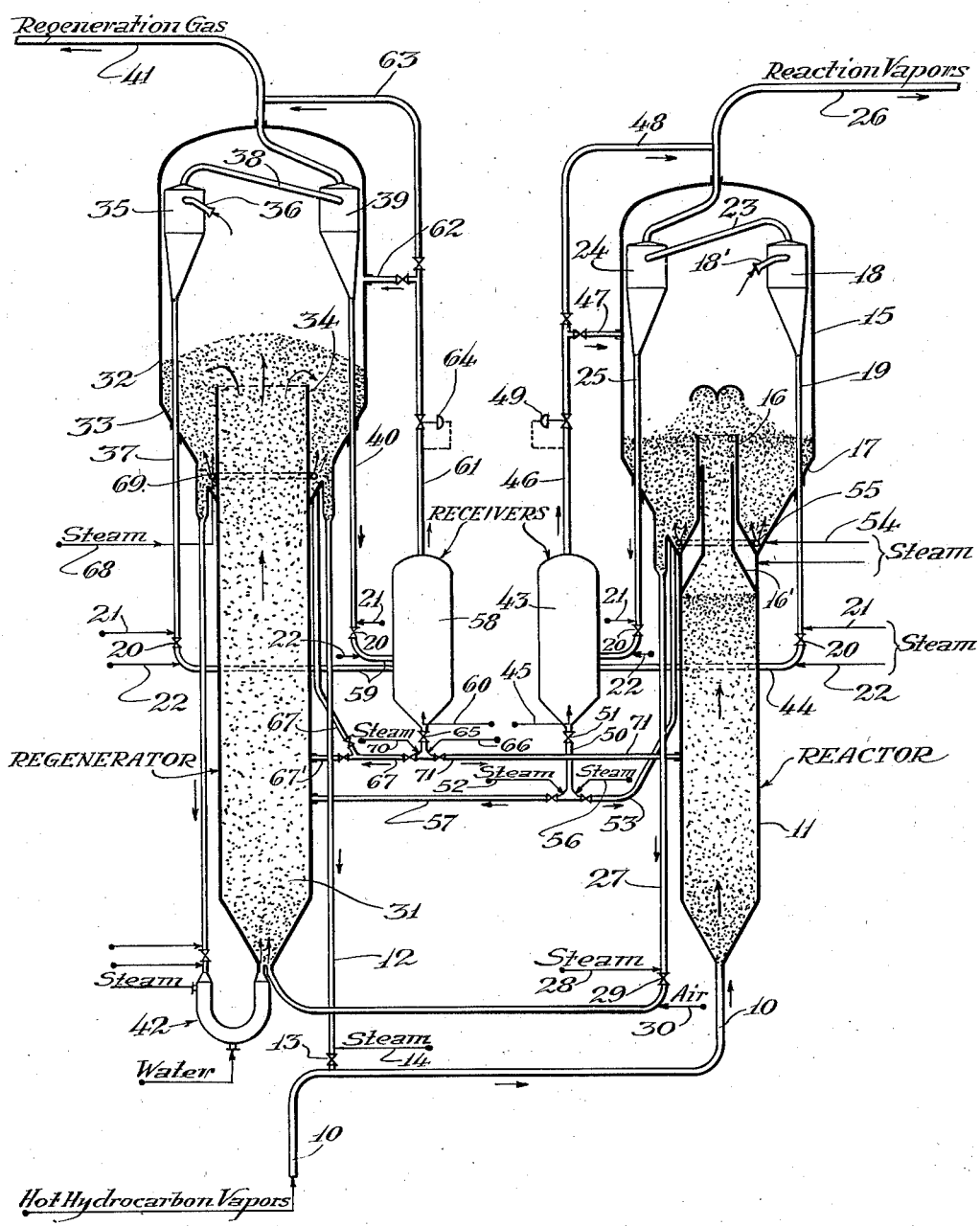

The invention will be more clearly understood from the following detailed description read in conjunction with the accompanying drawings which form a part of the specification and in which:

Figure 1 is a schematic flow diagram illustrating one form of my invention as applied to a catalytic cracking system; and Figure 2 is a schematic flow diagram illustrating a modification of the invention employing separate catalyst fines receivers.

While the invention is applicable to a wide variety of catalytic conversion systems it is primarily designed for hydrocarbon conversion processes such as isomerization, desulfurization, polymerization, reforming, isoforming, alkylation, gas reversion, hydrogenation, dehydrogenation, etc. and it is particularly applicable to the catalytic cracking of gas oils and heavier hydrocarbons. The charging stock may consist of or may contain hydrocarbons produced by other conversion processes such as cracking or coking, hydrocarbons synthetically produced by the hydrogenation of carbonaceous materials, or hydrocarbons produced by a carbon monoxide-hydrogen synthesis. In my preferred embodiment I will describe the invention as applied to the catalytic cracking of Mid-Continent gas oil.

The gas oil feed stock is vaporized and heated in conventional heat exchangers and pipe still coils to a temperature of about 800 to 1000° F., for example about 900° F., and is introduced at a pressure of about atmospheric to 50 pounds per square inch, for example about 15 pounds per square inch, through transfer line 10 to the bottom of reactor 11. Various amounts of steam, i. e., about 2 to 20% by weight, may be included with the hot vapors so introduced. The transfer line vapors pick up powdered catalyst from the base of standpipe 12 in amounts regulated by valve 13 and carry this catalyst into reactor 11. The pressure at the base of standpipe 12 should be about 1 to 5 pounds per square inch higher than the pressure in transfer line 10. The catalyst in standpipe 12 is maintained in fluent condition by aeration steam introduced through line 14.

Reactor 11 should be of such size and shape as to effect contact of the vapors with the necessary amount of catalyst and for the necessary amount of time. In this case the catalyst is preferably of the silica-alumina or silica-magnesia type and it may be prepared by the acid treating of natural clays such as bentonite or by synthetically preparing a powdered silica-alumina or silica-magnesia mixture. Such a mixture may be prepared by ball-milling silica hydrogel with alumina or magnesia, drying the resulting dough at a temperature of about 240° F. and then activating by heating to a temperature of about 900 to 1000° F. The catalyst per se forms no part of the present invention and it is, therefore, unnecessary to describe it in further detail.

With catalyst in powdered form, having a particle size of about 1 to 100 microns, I prefer to employ vapor velocities in the reactor of about .4 to 4 feet per second, for example about 1½ or 2 feet per second in the reactor. The catalyst-to-oil weight ratio may be about 1:1 to about 16:1 and is preferably about 4:1. The catalyst residence time may range from a few seconds to an hour or more, for example, it may be about 5 to 10 minutes. The vapor residence time is usually about 10 to 30 seconds. The catalyst introduced through line 12 may be at a temperature of about 900 to 1000° F., for example about 950° F., and the temperature prevailing throughout the reactor may thus be maintained at about 900 to 925° F.

The catalyst in this specific example is in powdered form with a particle size of about 1 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. Higher gas or vapor velocities may be required for coarser catalyst particles, but these particles may be of such size as to be retained on a 400, 300, 200, 100, 50 or even 10 mesh screen.

The density of the catalyst particles per se may be as high as 160 pounds per cubic foot but the bulk density of catalyst which has settled for 5 or 10 minutes will usually be from 25 to 40 pounds per cubic foot. With slight aeration, i. e., with vapor velocities of about .05 to .5 foot per second, the bulk density of 1 to 100 micron catalyst will be about 20 to 30 pounds per cubic foot. With vapor velocities of about 1 to 3 feet per second the catalyst is in the dense turbulent suspended catalyst phase and the bulk density of such catalyst may be about 10 to 20 pounds, for example, about 15 pounds to 18 pounds per cubic foot. With higher vapor velocities, i. e., the vapor velocities employed in transfer lines, the catalyst is in a light dispersed phase, the density of which may be only about 1 or 2 pounds per cubic foot or even less. Similarly, the light dispersed catalyst phase in the top of the reactors may have a density of about 50 or 100 grains to 5 pounds per cubic foot. The light dispersed catalyst phase is at least 5, and is preferably at least 10, pounds per cubic foot lighter than the dense turbulent suspended catalyst phase. This latter phase is at least 1, preferably at least 5, pounds per cubic foot lighter than the aerated settled catalyst.

The bulk density of this aerated catalyst phase or the dense turbulent suspended catalyst phase is greater in the absence of appreciable catalyst fines than in the presence of substantial amounts of such fines. When catalyst consists almost entirely of fines (as exemplified by catalyst particles separated by cyclones after the bulk of the catalyst has been removed by settling) the bulk density of settled or lightly aerated catalyst may be only 10 or 15 pounds per cubic foot.

The upward vertical velocity of vapors in reactor 11 are at such a rate as to maintain the catalyst in the reactor in the dense, turbulent suspended catalyst phase. This reactor may extend upwardly into settling chamber 15 so that the space between the upper reactor walls 16 and the outer settling chamber walls 15 will provide an upper hopper for settled catalyst. When the diameter of the reactor is narrowed at its upper end and a false head 16' is adjustably supported therein, the effective volume of the catalyst chamber, i. e., the dense phase catalyst level therein may be easily controlled. When the upper end of the reactor is not restricted the catalyst may flow directly from the reactor to the hopper with no increase in upward velocity and without the bulk of the catalyst passing from dense phase to dilute phase conditions.

The enlarged separating chamber 15 is connected to the reactor by inclined laterally extending wall 17 which forms the base of the upper hopper. Inside the settling chamber and around the periphery thereof I provide a plurality of cyclone separators. I may employ 1, 2, 3 or more stages of cyclone separators and I may employ parallel operation in any one or more of said stages. The dip legs from each of these cyclones extend through the laterally extending wall 17 so that control valves, aeration steam inlets, etc. may be outside of the separation chamber and, therefore, easily accessible.

Gas from the upper part of separation chamber 5 may be picked up by one or more lines 18' at a pressure of about 8 pounds per square inch and conducted to primary cyclones 18. Each of the primary cyclones 18 has its respective dip leg 19 which extends through outwardly extending wall 17 and which is provided at its base with an external regulating valve 20. Valve 20 and the dependent elbow should be so designed that cleaning devices can be inserted for cleaning the dip legs, should this be necessary. Aeration steam may be introduced into each dip leg from line 21 at a point immediately above external valve 20 for maintaining the settled catalyst in the dip leg in aerated condition. Steam from line 22 picks up catalyst from the base of dip leg 19 and returns this catalyst at the base of the hopper between walls 15 and 16. The steam which is thus introduced at the base of the hopper not only serves to inject catalyst fines at the base of the coarse catalyst material in the hopper but it effects an admixing of the catalyst fines with the coarser catalyst particles and a stripping of hydrocarbon vapors from both the fine and coarse catalyst in the hopper.

The pressure drop through primary cyclones 18 may be about ½ pound so that gases may leave cyclones 18 through line 23 to secondary cyclones 24 which are provided with dip legs 25. These dip legs likewise pass through outwardly extending wall 17 and at their base are provided with an aerating steam inlet 21, regulating valve 20 and a steam line 22 for returning the catalyst to the upper hopper. The rate of steam injection through line 22 or the adjustment of valve 20 may be automatically controlled in accordance with the pressure head in the dip leg for insuring smooth and continuous catalyst discharge therefrom. While only one primary and one secondary cyclone are shown in the drawings it will be understood that any number of primaries or secondaries may be used and that tertiary cyclones may likewise be employed. These cyclones are preferably spaced around the settling chamber 15 so that the injecting steam from lines 22 will furnish the necessary aeration and stripping steam for the upper hopper. I may, of course, introduce additional aeration or stripping steam into said hopper and distribute said steam by means of a perforated annular conduit or by any other conventional means.

The vapors from cyclone 24 may be passed through one or more additional cyclone separation stages and then withdrawn through line 26 to a suitable fractionation system (not shown). I prefer to effect the fractionation of the heavier products, i. e., gas oils and heavier hydrocarbons at a relatively low pressure,—about 5 pounds per square inch. Any unrecovered catalyst may be recycled with the heaviest condensate with fresh feed entering the pipe still. The overhead from this initial fractionation is preferably cooled to condense and separate water and the remaining hydrocarbons are then fractionated at high pressure, about 100 to 150 pounds per square inch, in any suitable arrangement of fractionators, absorbers, stabilizers, etc. to obtain the desired gas and gasoline fractions. Since the product fractionation forms no part of the present invention it will not be described in further detail.

Spent catalyst is withdrawn from the lower part of the upper hopper through standpipe 27 which is aerated by steam introduced by line 28 immediately above control valve 29. Catalyst is picked up from the base of this standpipe by air introduced through line 30 and is carried thereby into regeneration chamber 31 which is similar to conversion reactor 11 although it may be larger in size, particularly if temperature control is effected by the recycling of regenerated catalyst through a cooler and back to the regenerator. The regenerator is designed for a vertical gas velocity of about .4 to 4 feet per second, preferably about 2 feet per second, so that a dense turbulent suspended catalyst phase is maintained therein. The regenerator is superimposed by an enlarged settling chamber 32 which is connected to the reactor by outwardly extending wall 33, the space between the top walls 34 of the regenerator and the outer walls 32 of the settling chamber forming the upper hopper for regenerated catalyst. Dense phase catalyst may flow directly into this upper hopper and any catalyst particles which remain suspended in the dilute phase are removed therefrom by means of cyclone separators mounted inside the settling chamber and around the periphery thereof. Thus regeneration gases enter primary cyclone 35 through line 36. Separated catalyst from this cyclone passes through dip leg 37 which extends through wall 33, its lower end being provided with external control valve 20, a steam aerating line 21 and a steam injection line 22. Here again the steam from line 22 effects a stripping of the catalyst in the hopper as well as the injection of catalyst fines at the base of the coarser catalyst material in the hopper. Where unduly large amounts of steam might be thus introduced into the settling chamber or where a bottom draw-off is employed instead of an upper settling chamber, I may return these fines through line 22' back into the regenerator chamber 31.

The gases from primary cyclone 35 are introduced through line 38 to secondary cyclone 39 in which the catalyst fines are discharged from dip leg 40 which extends through wall 33 and is provided with an external operating valve and steam line. Any number of stages and any number of cyclones in each stage may thus be employed. The final regeneration gases are withdrawn through line 41, through a suitable heat exchanger, waste heat boiler, turbine or the like for utilizing the energy thereof. Residual catalyst fines may be removed from regeneration gas by an electrostatic precipitator.

Temperature control in the regenerator may be effected by withdrawing regenerated catalyst from the upper hopper above the regenerator, passing it through a cooler and reintroducing it at the base of the regenerator. The cooler may be a U type heat exchanger comprising a U shaped casing or shell with a header at its upper ends and with U shaped tubes welded or otherwise secured to the headers. The aerated catalyst preferably passes through the tubes. Water or other heat transfer fluid may be introduced into the shell and hot fluids such as steam withdrawn from the upper part thereof. The advantage of this type of heat exchanger is that it avoids expansion problems since each tube is free to expand or contract without exerting undue stresses on the tube header. Alternatively, "Stirling-type" boiler tubes may be mounted in the regenerator and around the periphery thereof. The particular temperature control means are schematically represented in the drawings by recycling system 42.

In the above modification each cyclone dip leg is provided with a separate positive injection means for returning catalyst fines to the lower part of the upper hopper and the injection steam serves the separate and distinct function of stripping the catalyst. In Figure 2 I have illustrated a modification of the invention wherein the catalyst fines from the cyclones are not returned directly to the upper hopper but are collected in a separate receiver and thence either returned to the upper hopper or to another reactor. Associated with reactor 11 I may provide a receiver 43 and each of the dip legs 19, 25, etc. is provided with separate positive means for injecting catalyst fines into this receiver. Here again steam may be employed as the injecting means, the catalyst being introduced by steam from lines 22, through lines 44 into receiver 43. If lines 44 lead to the base of the receiver the steam may also serve as the aeration and stripping gas for catalyst therein. Alternatively, I may introduce aeration or stripping steam through line 45.

The injection steam and aeration steam is withdrawn from the top of receiver 43 through line 46 and it may be introduced through line 47 into the upper part of separation chamber 15 or through line 48 to conduit 26. The introduction through line 47 offers the advantage of providing for the recovery of any solids which may remain suspended in the steam. Introduction through line 48 provides the advantage of more uniform pressure. The pressure in receiver 43 may be held substantially constant by means of pressure control valve 49 and this valve may be set to maintain a higher pressure in the receiver than is maintained in separation chamber 15.

Catalyst fines may be withdrawn from the base of receiver 43 through conduit 50 which is provided with regulating valve 51. Steam from line 52 may inject this catalyst through line 53 to the lower part of the upper hopper in the base of chamber 15. Here again the injecting steam may serve for aerating the catalyst in the upper hopper providing, of course, that suitable distributing lines are provided. Separate aerating and stripping steam may be introduced through line 54 to distributor 55.

Instead of returning the separated catalyst fines to the coarse material in the upper hopper I may introduce steam through line 56 for injecting catalyst through line 57 directly into regenerator 31. The catalyst fines may be injected into the regenerator at an intermediate point it being essential of course that the pressure at valve 51 be greater than the pressure in line 57 or in the regenerator at the point of introduction.

Receiver 58 may be a counterpart of receiver 43. Catalyst may be injected thereto by separate positive means at the base of each dip leg 37, 40, etc. For example, steam may be introduced through lines 22 for injecting the catalyst through lines 59. Additional aerating steam may be introduced through line 60. This injection of aerating steam may be taken overhead through line 61 and either introduced into the separation chamber through line 62 or into the vapor discharge line 63.

A constant pressure in receiver 58 is maintained by pressure control valve 64. Catalyst from the base of the receiver may be withdrawn in amounts regulated by valve 65 and introduced by steam from line 66 through line 67 to the lower part of the upper hopper in chamber 32 (or directly into regenerator 31 through line 67' if the steam cannot be tolerated in the settling chamber or if a bottom draw-off from chamber 31 is employed).

Here again line 67 may be provided with suitable distributing means for supplying the stripping steam in the hopper or stripping steam may be introduced through line 68 in distributing means 69.

Instead of being returned to the upper hopper or regenerator the catalyst may be injected by steam from line 70 through line 71 to reactor 11.

While I have described steam as the injection means for positively discharging catalyst from the base of dip legs and for positively transferring catalyst from receivers it should be understood that mechanical pumps such as Fuller-Kenyon screws or other mechanical means may be employed instead of pneumatic means. The important consideration is that each dip leg should be provided with its separate pump or positive catalyst transfer means. In my system the plugging or emptying of any particular dip leg will have no effect upon the operation of the remaining dip legs and no appreciable effect on the operation of the system in its entirety. Lines 46 and 61 serve a very important function of maintaining constant pressure in receivers 43 and 58 respectively. Even if catalyst were transferred from the base of receivers 43 and 58 to the upper part of chambers 15 or 32 respectively the maintenance of a constant pressure in the receiver and the provision of separate and independent injection means at the base of each dip leg will insure a more uniform and smoother operation than would be possible in systems heretofore employed.

While I have described in detail certain examples of my invention it should be understood that the invention is not limited to the particular modifications or operating conditions hereinabove set forth as many alternative operating conditions and modifications will be apparent to those skilled in the art from the above description.

I claim:

1. In a catalytic conversion system of the type wherein a gas or vapor passes upwardly in a contacting zone and is contacted in said zone with a dense turbulent suspended catalyst phase, wherein the bulk of the catalyst is removed from gases and vapors in an enlarged settling zone and wherein residual catalyst material is removed from gases or vapors by means of cyclone separators, the method of combining cyclone separated catalyst with settled catalyst which comprises positively impelling cyclone separated catalyst into a body of settled catalyst by means of steam and introducing said cyclone separated catalyst into the body of settled catalyst at a low point therein whereby the impelling steam effects aeration and stripping of the settled catalyst.

2. The method of claim 1 which includes the steps of positively impelling cyclone separated catalyst into a separate receiving zone and maintaining a substantially constant pressure in said receiving zone.

3. In a catalytic hydrocarbon conversion system wherein hydrocarbon vapors pass upwardly through a conversion zone in contact with a dense turbulent suspended catalyst phase and thence to an enlarged catalyst settling zone wherein spent catalyst from said settling zone is then introduced into a regeneration zone and contacted with regeneration gases flowing upwardly therein at such a velocity as to maintain the catalyst in a dense turbulent suspended catalyst phase, wherein gases from the regeneration zone pass to an enlarged settling zone from which catalyst is returned to the conversion zone and wherein catalyst fines are separated from gases and vapors leaving said respective settling zones, the method of returning said catalyst fines to the system which comprises conveying said fines from a point inside of each settling zone to a point outside of the respective contacting zones and settling zones, and positively injecting said fines back into the system at such a point that they will not be resuspended in the gases or vapors in the settling zone from which they were removed.

4. The method of claim 3 wherein the catalyst fines are conveyed to a separate receiving zone and wherein a substantially constant pressure is maintained in said receiving zone.

5. The method of claim 3 wherein the catalyst fines are conveyed to a separate receiving zone and wherein a substantially constant pressure is maintained in said receiving zone which pressure is higher than the pressure in the separating zone from which the catalyst fines were removed.

6. The method of claim 3 wherein a body of settled catalyst is maintained in the lower part of the settling zone and wherein the removed catalyst fines are introduced into the bed of settled catalyst which is in the settling zone from which the catalyst fines were originally removed.

7. The method of claim 3 wherein catalyst fines removed from the settling zone immediately following one contacting zone is returned to the system by introducing it directly into a contacting zone.

8. In a catalytic hydrocarbon conversion system a vertical reactor, an enlarged settling chamber communicating with the top of said reactor and provided with a hopper for maintaining a bed of settled catalyst therein, a plurality of cyclone separators in said settling chamber, substantially vertical dip legs extending from said cyclone separators through the walls of said chamber to a point outside of said chamber, positive catalyst transfer means at the base of each dip leg, and means for returning catalyst from the base of the dip legs to a dense catalyst phase in the system.

9. The apparatus in claim 8 which includes a separate catalyst receiver, means for introducing catalyst from a plurality of dip legs into said receiver and means for maintaining a substantially constant pressure in said receiver.

10. In a catalytic conversion system an up-flow gas or vapor reactor, means for introducing catalyst and gases or vapors into said reactor whereby dense turbulent suspended catalyst phase may be maintained therein, an enlarged separation chamber superimposed above said reactor, a laterally extending wall between said reactor and said separation chamber, means for maintaining a body of settled catalyst in the base of said separation chamber, a primary cyclone separator in said separation chamber, a dip leg extending substantially vertically from said cyclone separator through said laterally extending wall and means for positively impelling catalyst from the base of said dip leg and for returning said catalyst to a point in the system wherein the catalyst is in dense phase condition.

11. The apparatus of claim 10 wherein said dip leg is provided with a control valve and an aeration steam connection at a point outside of said settling chamber.

12. The apparatus of claim 10 which includes a secondary cyclone separator in said chamber, means for introducing gases or vapors from said primary cyclone separator to said secondary cyclone separator, a dip leg extending from said secondary cyclone separator through said outwardly extending wall, separate means for impelling catalyst from the base of said last-named dip leg and means for returning said catalyst to a point in the system wherein the catalyst is in dense phase condition.

13. In an apparatus for separating fine and coarse powdered solids from a suspending gas or vapor, an enlarged settling chamber provided at its base with a hopper for settled coarse solid particles, a plurality of cyclone separators mounted within said chamber, dip legs extending from each cyclone separator substantially vertically to a point outside of said chamber, control valves on each of said dip legs at a point outside of said chamber, separate means for impelling fine solid particles at the base of each dip leg, and means for returning said fine solid particles to said hopper at a point below the level of settled solids therein.

14. The apparatus of claim 13 which includes a separate receiver for the fine solid particles and means for maintaining a substantially constant pressure in said receiver.

15. The apparatus of claim 13 wherein at least one of said cyclone separators operates at a different pressure than at least one other of said cyclone separators.

GEORGE W. WATTS.